United States Patent
Higgins (10) Patent No.: US 9,753,797 B1
(45) Date of Patent: Sep. 5, 2017

(54) RELIABLE INTERMEDIATE MULTICAST COMMUNICATIONS

(75) Inventor: Chris Higgins, Sammamish, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 110 days.

(21) Appl. No.: 13/218,768

(22) Filed: Aug. 26, 2011

(51) Int. Cl.
*G06F 11/00* (2006.01)
*G06F 11/07* (2006.01)

(52) U.S. Cl.
CPC ...... *G06F 11/0784* (2013.01); *G06F 11/0772* (2013.01)

(58) Field of Classification Search
CPC .......................... G06F 11/0784; G06F 11/0772
USPC ............... 714/48, 57; 370/225, 227
See application file for complete search history.

(56) References Cited

U.S. PATENT DOCUMENTS

| | | | |
|---|---|---|---|
| 6,751,443 B2* | 6/2004 | Haymes et al. | 455/67.11 |
| 6,751,747 B2* | 6/2004 | Li | 714/4.1 |
| 7,171,590 B2* | 1/2007 | Kadoi | 714/48 |
| 7,805,637 B2* | 9/2010 | Van Haegendoren et al. | 714/47.1 |
| 2002/0112152 A1* | 8/2002 | VanHeyningen et al. | 713/151 |
| 2002/0116669 A1* | 8/2002 | Jain | 714/43 |
| 2003/0191992 A1* | 10/2003 | Kaminsky | G06F 11/0727 714/712 |
| 2004/0109406 A1* | 6/2004 | Rothman et al. | 370/216 |
| 2004/0163016 A1* | 8/2004 | Kim | 714/47 |
| 2006/0168486 A1* | 7/2006 | Cromer et al. | 714/100 |
| 2007/0088974 A1* | 4/2007 | Chandwani et al. | 714/6 |
| 2010/0077251 A1* | 3/2010 | Liu et al. | 714/4 |
| 2012/0216083 A1* | 8/2012 | Windell et al. | 714/57 |
| 2012/0236778 A1* | 9/2012 | Erdmann et al. | 370/312 |

* cited by examiner

*Primary Examiner* — Philip Guyton
(74) *Attorney, Agent, or Firm* — Davis Wright Tremaine LLP (57) ABSTRACT

In certain embodiments, a computer-implemented method includes detecting, by a first processing system, that a failure event operable to cause the first processing system to become inoperable has occurred. The method further includes communicating, by the first processing system using multicasting, a notification to two or more proxy processing systems. At least one of the proxy processing systems is operable to receive the notification and communicate the notification to a second processing system on behalf of the first processing system using a reliable communications protocol.

20 Claims, 3 Drawing Sheets

RELIABLE INTERMEDIATE MULTICAST COMMUNICATIONS

BACKGROUND

Processing systems may at times experience malfunctions or disruptions which cause the processing system abruptly to shut down or otherwise become inoperable. For example, a computer system may experience a software or a hardware problem which causes the computer system to reboot or otherwise become inoperable with little or no notice. Typically, a processing system that abruptly becomes inoperable does not have the resources to establish a communication session with a remote system in which to communicate reasons for the inoperability.

BRIEF DESCRIPTION OF THE DRAWINGS

For a more complete understanding of the present disclosure and its advantages, reference is made to the following descriptions, taken in conjunction with the accompanying drawings, in which.

DESCRIPTION OF EXAMPLE EMBODIMENTS

Processing systems such as computers often experience failure events such as disruptions in power that cause an abrupt failure and/or "shut down" of the processing system. For example, a failure event such as a software crash or a hardware malfunction may cause a computer to shut down or otherwise become inoperable with little or no notice. As another example, a processing system may determine that an internal temperature has exceeded a predetermined limit and may take steps to quickly shut down in order to avoid any harm to the processing system.

Many processing systems keep log files of events that occur on the processing system for diagnostic purposes. However, processing systems that quickly become inoperable due to failure events may not have the resources and/or time to establish a communications session with another processing system in order to communicate the log file or other information about the shutdown to the other processing system. For example, many processing systems communicate using a communications protocol that uses extensive handshaking routines before a communications link with another processing system is established. Such communications protocols typically require more time, power, and/or processing resources to establish a communications link than is available to a processing system that becomes inoperable, particularly due to some type of failure event.

Certain embodiments of the present disclosure provide reliable intermediate multicast communications that may allow processing systems that are shutting down or that otherwise become inoperable to quickly and efficiently communicate a notification to an external processing system. In certain embodiments, a notification communicated by a first processing system that becomes inoperable is received via multicasting by one or more proxy processing systems and is then communicated by at least one proxy processing system to a second processing system using a reliable communications protocol. Thus, the proxy processing systems are able to take responsibility for notifying an appropriate processing system (e.g., using a suitable reliable communications protocol) of the inoperability of the failing processing system and/or information regarding the failure event. FIGS. 1 through 4 below illustrate systems and methods for providing reliable intermediate multicast communications according to certain embodiments of the present disclosure.

Figure 1:
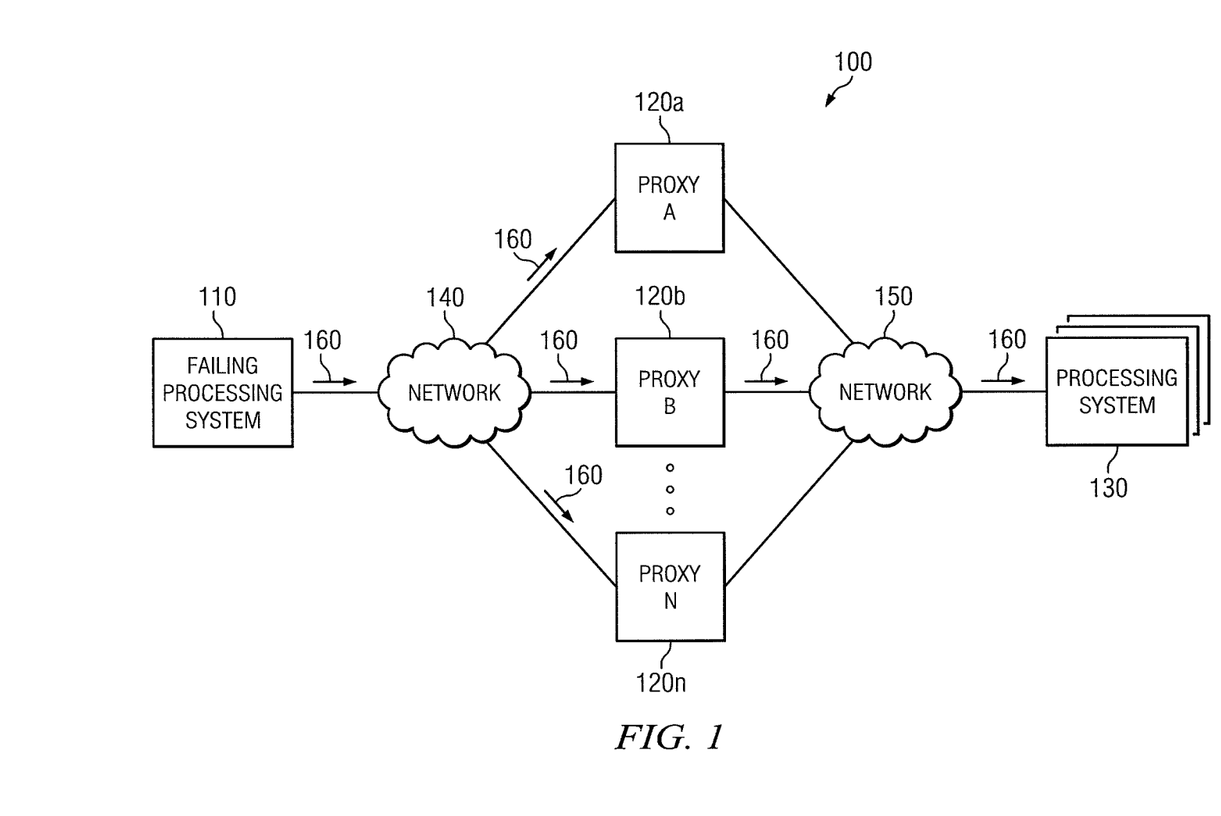
FIG. 1 illustrates an example system for providing reliable intermediate multicast communications, according to certain embodiments of the present disclosure.

FIG. 1 illustrates an example system 100 for providing reliable intermediate multicast communications, according to certain embodiments of the present disclosure. In the illustrated example, system 100 includes a failing processing system 110, proxy processing systems 120, and second processing system 130. In certain embodiments, failing processing system 110, proxy processing systems 120, and second processing system 130 may be communicatively coupled via a communication network such as networks 140 and 150. Although system 100 is illustrated and primarily described as including particular components, the present disclosure contemplates system 100 including any suitable components, according to particular needs.

In general, system 100 provides reliable intermediate multicast communications that enable failing processing system 110 to communicate a notification 160 to second processing system 130 before failing processing system 110 becomes inoperable. In particular, failing processing system 110 may detect that a failure event has occurred and, in response, may communicate to proxy processing systems 120 notification 160 using multicasting prior to or substantially simultaneous with failing processing system 110 becoming inoperable. One or more proxy processing systems 120 may receive notification 160 and communicate notification 160 to second processing system 130 on behalf of failing processing system 110 using a reliable communications protocol. Example embodiments of processing system 110 and proxy processing systems 120 are described below with reference to FIG. 2, and a method of providing reliable intermediate multicast communications are described below with reference to FIG. 3. In addition, embodiments of a computer system that may be used for one or more portions of the example system of FIG. 1 are described below with reference to FIG. 4.

Failing processing system 110 may be any appropriate processing system that is capable of communicating using multicasting. For example, failing processing system 110 may include any appropriate computer system such as a personal computer, workstation, network computer, kiosk, personal data assistant (PDA), one or more Internet Protocol (IP) telephones, smart phones, tablet computers, one or more servers, a server pool, a router, or any other suitable computer system or network device. Failing processing system 110 may be a stand-alone processing system or may be a part of a larger network of processing systems associated with an entity. Particular embodiments of failing processing system 110 are described in more detail below with reference to FIG. 2.

Proxy processing systems 120 may be any suitable network device that is capable of communicating using both multicasting and a reliable communications protocol. In some embodiments, proxy processing systems 120 may include any appropriate computer system such as a personal computer, workstation, network computer, kiosk, PDA, IP telephone, smart phone, tablet computer, server, server pool, router, or any other suitable computer system or network device. Particular embodiments of proxy processing system 120 are described in more detail below with reference to FIG. 2.

Figure 2:
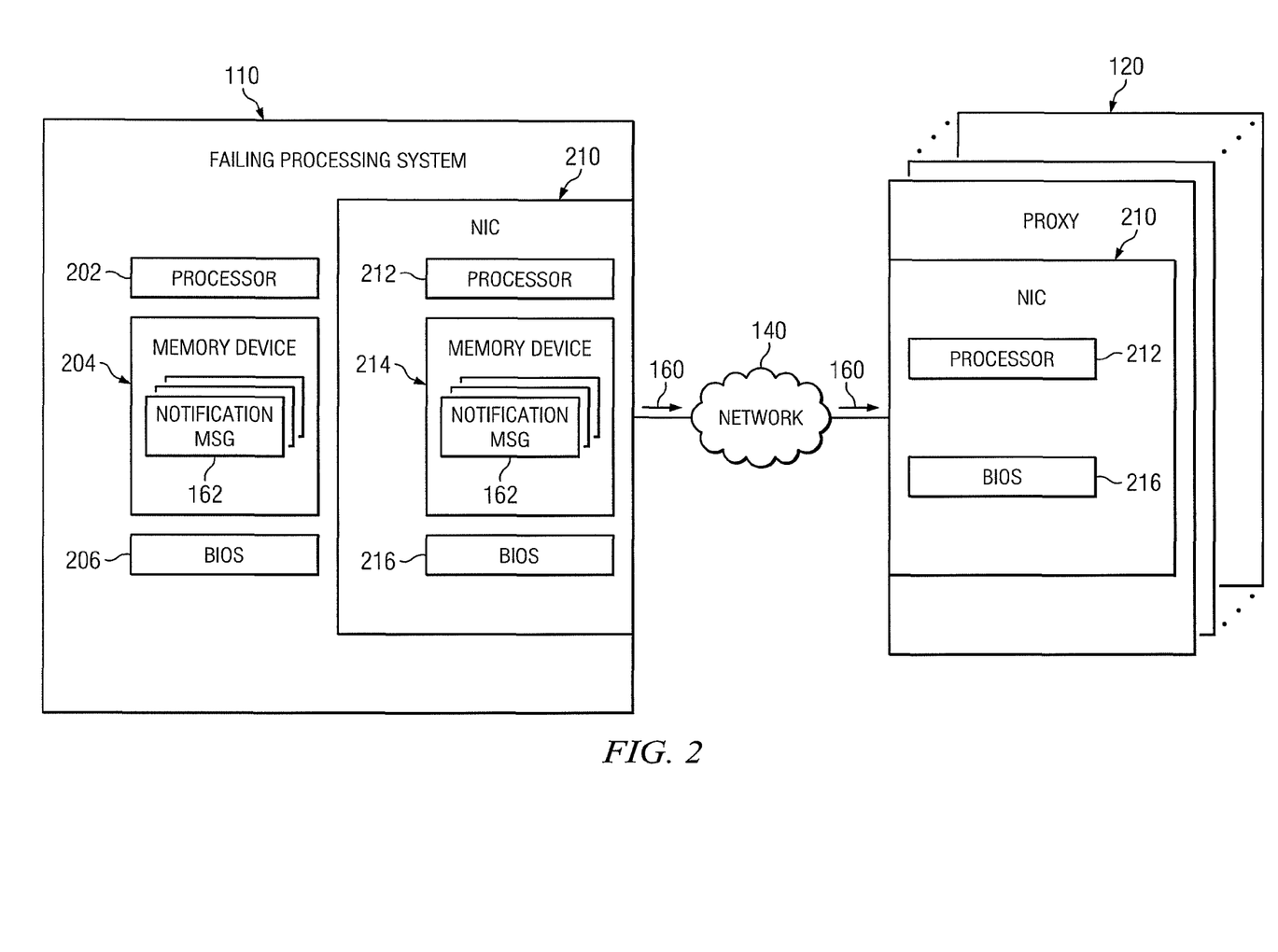
FIG. 2 illustrates an example processing system and proxy processing system of the example system of FIG. 1, according to certain embodiments of the present disclosure.

FIG. 2 illustrates an example failing processing system 110 and proxy processing systems 120. In this embodiment, failing processing system 110 includes a processor 202, one or more memory devices 204, and BIOS 206. In some embodiments, failing processing system 110 may include a network interface card (NIC) 210, or any other appropriate hardware and/or software for communicating using multicasting. In some embodiments, NIC 210 may include a processor 212, one or more memory devices 214, and BIOS 216. In some embodiments, NIC 210 and/or failing processing system 110 may include dedicated circuitry to detect a failure event affecting failing processing system 110. In some embodiments, the dedicated circuitry may include a power source such as a capacitor or battery that allows the dedicated circuitry to remain operable for at least a short time (e.g., at least long enough to communicate a multicast notification of the failure event) if the main power source to failing processing system 110 is removed.

In some embodiments, proxy processing systems 120 may include a NIC 210 that couples proxy processing system 120 to network 140 and/or network 150. In some embodiments, one or more proxy processing systems 120 may be integrated with failing processing system 110 and/or second processing system 130. In other embodiments, proxy processing systems 120 are separate from failing processing system 110 and second processing system 130.

Returning to FIG. 1, second processing system 130 may include any appropriate computer system and/or processing system at one or more locations. Second processing system 130 may include any appropriate input devices, output devices, mass storage media, processors, memory, or other suitable components for receiving, processing, storing, and communicating data. For example, second processing system 130 may be a network management processing system, a personal computer, workstation, network computer, kiosk, wireless data port, PDA, IP telephone, one or more processors within these or other devices, or any other suitable processing device. Second processing system 130 may be a stand-alone processing system or may be a part of a larger network of processing systems associated with an entity.

In some embodiments, second processing system 130 may be a network management processing system that manages the routing of traffic to network devices such as failing processing system 110. In some embodiments, second processing system 130 may be a syslog server or any other appropriate device for logging program messages. For example, second processing system 130 may be a syslog server that is used for the general analysis and debugging of processing systems such as failing processing system 110 using information such as notification 160.

Each failing processing system 110, proxy processing system 120, and second processing system 130 may include one or more processing units (e.g., processors 202 and 212) and one or more memory devices (e.g., memory devices 204 and 214). The one or more processing units may include one or more microprocessors, controllers, or any other suitable computing devices or resources. The one or more processing units may work, either alone or with other components of system 100, to provide a portion of the functionality of system 100 described herein. The one or more memory units may take the form of volatile or non-volatile memory including, without limitation, magnetic media, optical media, random-access memory (RAM), read-only memory (ROM), removable media, or any other suitable memory component.

Notification 160 may be any appropriate data communicated by failing processing system 110. In some embodiments, notification 160 includes an indication and/or a description of a failure event that caused failing processing system 110 to become inoperable. In some embodiments, notification 160 includes an indication of a last known state of failing processing system 110 and/or of an impending state of failing processing system 110. In some embodiments, notification 160 may include a timestamp of when the failure event that caused failing processing system 110 to become inoperable occurred. The disclosure anticipates notification 160 containing any appropriate data concerning the failure event that caused failing processing system 110 to become inoperable.

As used herein, multicasting refers to any appropriate method or technique that may be utilized by failing processing system 110 to communicate notification 160 to be potentially received by multiple recipients prior to becoming inoperable. In some embodiments, notification 160 may refer to a User Datagram Protocol (UDP) message. In contrast to a reliable communications protocol described in more detail below, multicasting is a best-effort delivery mechanism in which the sender of a message such as notification 160 does not receive a confirmation of the delivery of the message. In addition, messages such as UDP messages may be transmitted without requiring prior communications to set up special transmission channels or data paths. In some embodiments, notification 160, such as a UDP message, may be communicated to a multicast address that is monitored and/or subscribed to by one or more proxy processing systems 120. As a result, multicasting may require less time, processing power, and/or power than other communication techniques.

As used herein, reliable communications protocol refers to any appropriate reliable protocol that may be utilized by proxy processing systems 120 to communicate notification 160 to second processing system 130 on behalf of failing processing system 110. In some embodiments, reliable communications protocol refers to Transmission Control Protocol (TCP). In contrast to multicasting, TCP and other reliable communications protocols provide confirmation of the delivery of a message and/or confirmation of the establishment of a communications session between a sending processing system and a recipient processing system. As such, TCP and other reliable communications protocols typically require more time, processing power, and/or power than multicasting.

Networks 140 and 150 facilitate wireless or wireline communication. Networks 140 and 150 may communicate, for example, IP packets, Frame Relay frames, Asynchronous Transfer Mode (ATM) cells, voice, video, data, and other suitable information between network addresses. Networks 140 and 150 may include one or more personal area networks (PANs), local area networks (LANs), a wireless LAN (WLAN), a virtual private network (VPN), radio access networks (RANs), metropolitan area networks (MANs), wide area networks (WANs), mobile networks (e.g., using WiMax (802.16), WiFi (802.11), 3G, or any other suitable wireless technologies in any suitable combination), all or a portion of the global computer network known as the Internet, an extranet, a satellite network, and/or any other communication system or systems at one or more locations, any of which may be any suitable combination of wireless and wireline. Networks 140 and 150 may be combined, in whole or in part, or may be distinct, according to particular needs.

In operation of an example embodiment of system 100, failing processing system 110 may detect that a failure event has occurred that causes or will cause failing processing system 110 to become inoperable. In some embodiments, failing processing system 110 may detect that a failure event has occurred internal to failing processing system 110 (e.g., a software crash or a hardware malfunction). In other embodiments, failing processing system 110 may detect that a failure event has occurred external to failing processing system 110 (e.g., a failure to an external power supply that supplies power to failing processing system 110).

In some embodiments, a failure event may refer to an event such as any situation, error, malfunction, or the like that causes or may cause failing processing system 110 to become inoperable. Examples of failure events may include a power failure (including a power failure internal or external to failing processing system 110), a software crash, a hardware malfunction, and a measured temperature of the processing system or the environment around failing processing system 110 exceeding or dropping below a predetermined temperature, and the like. In some embodiments, the failure event causes failing processing system 110 to become inoperable substantially immediately after the failure event occurs. In some embodiments, a failure event results in an intentional shutdown of failing processing system 110.

As used herein, "inoperable" refers to a state in which failing processing system 110 is unable to operate in a nominal manner. For example, failing processing system 110 may become inoperable when software on failing system 110 crashes or otherwise becomes non-responsive, or when one or more hardware components malfunction. As another example, failing processing system 110 may become inoperable when any failure causes failing processing system 110 to be unable to communicate using a reliable communications protocol such as TCP. In some embodiments, failing processing system 110 may become inoperable when a system on which failing processing system relies experiences a failure. For example, if power supplied to failing processing system 110 from an external source is removed and/or falls below a pre-determined threshold, failing processing system 110 may become unable to operate in a nominal manner. In some embodiments, failing system 110 may become inoperable when it shuts down either in a planned or unplanned manner.

As a result of detecting that a failure event has occurred, failing processing system 110 may communicate notification 160 out to network 140 prior to becoming inoperable using any appropriate multicasting technique. As described above, notification 160 may include any appropriate data regarding the failure event that caused failing processing system 110 to shut down or otherwise become inoperable. In some embodiments, failing processing system 110 generates notification 160 after detecting the failure event but prior to communicating notification 160 out to network 140. In such embodiments, failing processing system 110 may gather any appropriate data such as a timestamp and/or details regarding the failure event and then formulate notification 160 using the gathered data.

In some embodiments, failing processing system 110 may access a plurality of pre-crafted notification messages stored in one or more memory devices coupled to failing processing system 110 to include in notification 160. For example, FIG. 2 illustrates a plurality of pre-crafted notification messages 162 stored in memory device 204 and/or memory device 214 of a NIC 210 that failing processing system 110 utilizes to communicate with network 140. In some embodiments, failing processing system 110 may compare pre-crafted notification messages 162 with the detected failure event in order to select one of the pre-crafted notification messages 162 to include in notification 160. As an example, if the failure event that caused failing processing system 110 to become inoperable was a software crash, failing processing system 110 may search for and locate a pre-crafted "software crash" notification message 162 to include in notification 160. In some embodiments, failing processing system 110 may modify the selected pre-crafted notification message 162 before including it in notification 160 (e.g., to add a timestamp, etc.). In other embodiments, failing processing system 110 may include an unedited pre-crafted notification message 162 in notification 160.

In some embodiments, failing processing system 110 may be modified in any appropriate manner to enable it to communicate notification 160 before becoming inoperable. As an example, BIOS 216 or other software of NIC 210 of failing processing system 110 may be modified to enable NIC 210 to send notification 160 before failing processing system 110 becomes inoperable. In such embodiments, failing processing system 110 may supply enough power to NIC 210 as it is shutting down to allow NIC 210 to remain attached to network 140 and to send notification 160 using multicasting. For example, a power source such as a capacitor or battery may supply power to NIC 210 to allow it to send notification 160 after a failure event is detected. In another example, BIOS 206 or other software of failing processing system 110 may be modified to send notification 160 before it becomes inoperable. The disclosure anticipates failing processing system 110 sending notification 160 in any appropriate manner before it becomes inoperable.

Once notification 160 is transmitted by failing processing system 110 using multicasting, it is received by proxy processing systems 120. Proxy processing systems 120, as described above, may be any appropriate network device that listens for notification 160 that was multicast on network 140. In some embodiments, for example, one or more proxy processing systems 120 may subscribe to and/or monitor a multicast address to which notification 160 is sent by failing processing system 110. Once a proxy processing system 120 receives notification 160, it may communicate notification 160 to second processing system 130 on behalf of failing processing system 110 using any appropriate reliable protocol (e.g., TCP). In some embodiments, proxy processing systems 120 communicate notification 160 across network 150 using the reliable protocol.

In some embodiments, notification 160 may be received by more than one proxy processing systems 120, and each proxy processing system 120 that receives notification 160 from failing processing system 110 transmits notification 160 to second processing system 130 using a reliable protocol. In other embodiments, notification 160 may be received by more than one proxy processing system 120, but only one proxy processing system 120 communicates notification 160 to second processing system 130. In such embodiments, proxy processing systems 120 may communicate with each other to coordinate which proxy processing system 120 communicates the one notification 160 to second processing system 130. For example, after receiving notification 160, a particular proxy processing system 120 may transmit a message to other proxy processing systems 120 to indicate that it has received notification 160 from failing processing system 110. If the particular proxy processing system 120 does not receive any indication from other proxy processing systems 120 that they also received notification 160 from failing processing system 110, the particular proxy processing system 120 may transmit the received notification 160 to second processing system 130 and then transmit an indication to the other proxy processing systems 120 that notification 160 was successfully delivered to second processing system 130. If, however, the particular proxy processing system 120 receives indications from other proxy processing systems 120 that they have also received notification 160 from failing processing system 110, the proxy processing systems 120 that received notification 160 from failing processing system 110 may further communicate with each other and delegate a particular proxy processing system 120 to transmit only a single notification 160 to second processing system 130. For example, a particular proxy processing system 120 may be selected to transmit notification 160 to second processing system 130 based on network latency, traffic loads of proxy processing systems 120, available resources of proxy processing systems 120, and the like.

As described above, second processing system 130 may be any processing system that may take any action upon receiving notification 160 from proxy processing systems 120. For example, second processing system 130, upon receiving notification 160, may cause traffic to be routed away from failing processing system 110. In some embodiments, second processing system 130 may cause traffic that was originally destined for failing processing system 110 to be routed to another processing system after receiving notification 160. In other embodiments, second processing system 130 may be a syslog server that stores notification 160 and enables users such as network administrators to be notified of and/or view details about notification 160.

System 100 provides many advantages over prior communications systems. For example, a processing system such as failing processing system 110 may be able to communicate a notification 160 prior to becoming inoperable that, in prior systems, may not have been communicated. As such, administrators of system 100 may be provided with information regarding failure events that caused failing processing system 110 to become inoperable without having to wait for failing processing system 110 to become operational again. By utilizing multicasting to transmit notification 160 before becoming inoperable to proxy processing systems 120, who in turn communicate notification 160 to second processing system 130 using a reliable protocol, failing processing system 110 may provide the cause of its inoperability in a timely and efficient manner.

Figure 3:
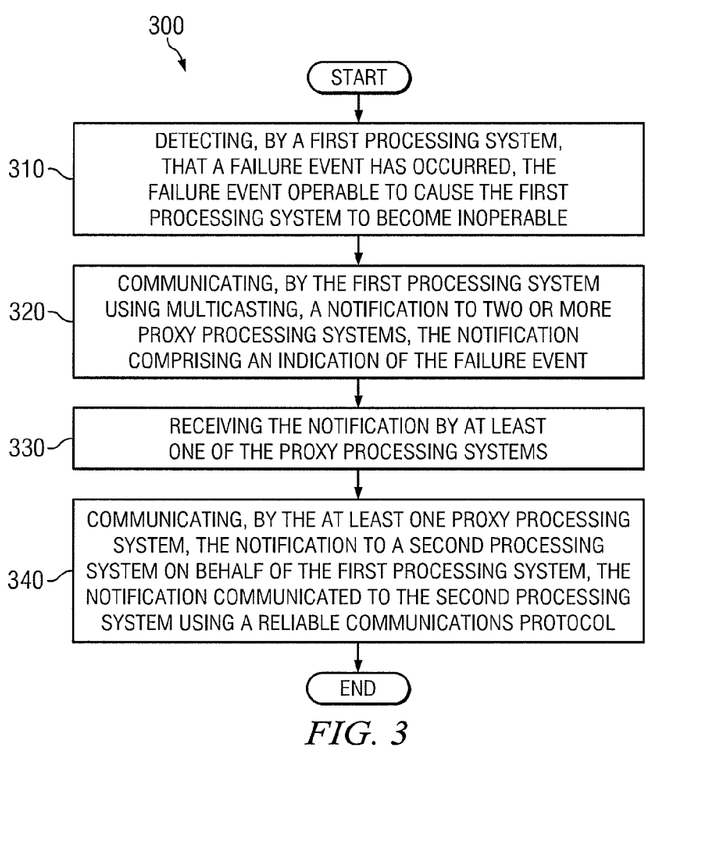
FIG. 3 illustrates an example method for providing reliable intermediate multicast communications, which may be performed by the example system of FIG. 1 according to certain embodiments of a present disclosure.

FIG. 3 illustrates an example method 300 for providing reliable intermediate multicast communications, which may be performed by the example system of FIG. 1 according to certain embodiments of a present disclosure. The method may be implemented in any suitable combination of software, firmware, and hardware. Although particular components may be identified as performing particular steps, the present disclosure contemplates any suitable components performing the steps according to particular needs.

At step 310, a first processing system detects that a failure event has occurred. In some embodiments, the failure event causes the first processing system to become inoperable. In some embodiments, the failure event causes the first processing system to initiate an intentional shut down. In some embodiments, the first processing system may refer to failing processing system 110 described above. In some embodiments, the failure event may be a power failure, a software crash, a hardware malfunction, a temperature of the first processing system exceeding a predetermined temperature, a temperature of the environment surrounding the first processing system exceeding or dropping below a predetermined temperature, or any other error or situation that causes the first processing system to become inoperable.

At step 320, the first processing system communicates a notification using multicasting. In some embodiments, the notification is communicated to two or more proxy processing systems. In some embodiments, the notification is communicated before the first processing system becomes inoperable. In some embodiments, the notification is communicated while resources required to communicate the notification (e.g., power) are still available. In some embodiments, the notification is communicated by dedicated circuitry of the first processing system while the remainder of the first processing system may or may not be operable. In some embodiments, the notification may refer to notification 160 described above. In some embodiments, the notification includes an indication of the failure event of step 310. In some embodiments, the two or more proxy processing systems refer to proxy processing systems 120 described above.

In some embodiments, the notification of step 320 is a UDP message. In some embodiments, the notification of step 320 is communicated from the first processing system to two or more proxy processing systems across a communications network. In some embodiments, the notification of step 320 is transmitted by the first processing system to a multicast address. In some embodiments, the notification of step 320 is transmitted to an intermediate system that transmits the notification to two or more proxy processing systems.

At step 330, the notification of step 320 is received by at least one of the proxy processing systems. At step 340, the at least one proxy processing system that received the notification in step 330 communicates the notification of step 330 to a second processing system on behalf of the first processing system using a reliable communications protocol. In some embodiments, the second processing system may refer to second processing system 130 described above. In some embodiments, the reliable communications protocol utilized to communicate the notification from the proxy processing system to the second processing system is TCP. After step 340, method 300 ends.

In some embodiments, more than one proxy processing system may communicate the notification of step 330 to a second processing system on behalf of the first processing system using a reliable communications protocol. In some embodiments, only a single proxy processing system communicates the notification of step 330 to the second processing system on behalf of the first processing system using a reliable communications protocol. In such embodiments, the proxy processing systems may coordinate with each other to ensure that only a single proxy processing system communicates the notification of step 330 to the second processing system. In some embodiments, a proxy processing system that communicates the notification of step 330 to the second processing system may additionally communicate an indication to other proxy processing systems that the notification was successfully delivered to the second processing system.

Figure 4:
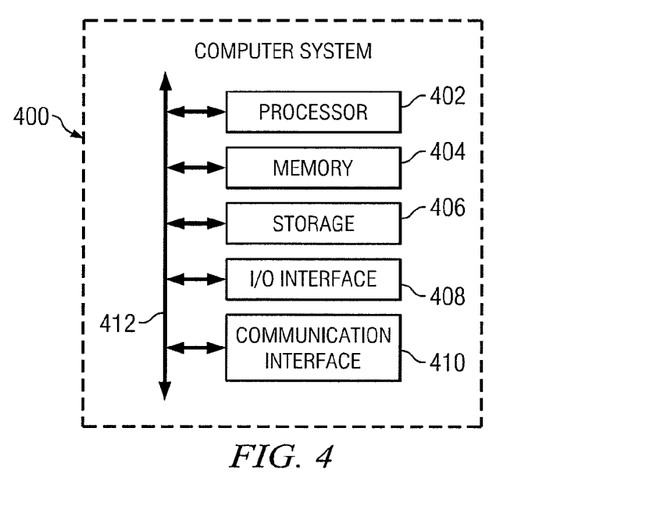
FIG. 4 illustrates an example computer system that may be used for one or more portions of the example system of FIG. 1, according to certain embodiments of the present disclosure.

FIG. 4 illustrates an example computer system 400 that may be used for one or more portions of the example system 100 of FIG. 1, according to certain embodiments of the present disclosure. For example, portions or all of failing processing system 110, proxy processing systems 120, and second processing system 130 may be implemented using all of the components, or any appropriate combination of the components, of computer system 400 described below. In particular embodiments, one or more computer systems 400 perform one or more steps of one or more methods described or illustrated herein. In particular embodiments, one or more computer systems 400 provide functionality described or illustrated herein. In particular embodiments, software running on one or more computer systems 400 performs one or more steps of one or more methods described or illustrated herein or provides functionality described or illustrated herein. Particular embodiments include one or more portions of one or more computer systems 400.

This disclosure contemplates any suitable number of computer systems 400. This disclosure contemplates computer system 400 taking any suitable physical form. As example and not by way of limitation, computer system 400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a PDA, a server, or a combination of two or more of these. Where appropriate, computer system 400 may include one or more computer systems 400; be unitary or distributed; span multiple locations; span multiple processing systems; or reside in a cloud, which may include one or more cloud components in one or more networks. Where appropriate, one or more computer systems 400 may perform without substantial spatial or temporal limitation one or more steps of one or more methods described or illustrated herein. As an example and not by way of limitation, one or more computer systems 400 may perform in real time or in batch mode one or more steps of one or more methods described or illustrated herein. One or more computer systems 400 may perform at different times or at different locations one or more steps of one or more methods described or illustrated herein, where appropriate.

In particular embodiments, computer system 400 includes a processor 402, memory 404, storage 406, an input/output (I/O) interface 408, a communication interface 410, and a bus 412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 402 includes hardware for executing instructions, such as those making up a computer program. As an example and not by way of limitation, to execute instructions, processor 402 may retrieve (or fetch) the instructions from an internal register, an internal cache, memory 404, or storage 406; decode and execute them; and then write one or more results to an internal register, an internal cache, memory 404, or storage 406. In particular embodiments, processor 402 may include one or more internal caches for data, instructions, or addresses. The present disclosure contemplates processor 402 including any suitable number of any suitable internal caches, where appropriate. As an example and not by way of limitation, processor 402 may include one or more instruction caches, one or more data caches, and one or more translation lookaside buffers (TLBs). Instructions in the instruction caches may be copies of instructions in memory 404 or storage 406, and the instruction caches may speed up retrieval of those instructions by processor 402. Data in the data caches may be copies of data in memory 404 or storage 406 for instructions executing at processor 402 to operate on; the results of previous instructions executed at processor 402 for access by subsequent instructions executing at processor 402 or for writing to memory 404 or storage 406; or other suitable data. The data caches may speed up read or write operations by processor 402. The TLBs may speed up virtual-address translation for processor 402. In particular embodiments, processor 402 may include one or more internal registers for data, instructions, or addresses. The present disclosure contemplates processor 402 including any suitable number of any suitable internal registers, where appropriate. Where appropriate, processor 402 may include one or more arithmetic logic units (ALUs); be a multi-core processor; or include one or more processors 402. Although this disclosure describes and illustrates a particular processor, this disclosure contemplates any suitable processor.

In particular embodiments, memory 404 includes main memory for storing instructions for processor 402 to execute or data for processor 402 to operate on. As an example and not by way of limitation, computer system 400 may load instructions from storage 406 or another source (such as, for example, another computer system 400) to memory 404. Processor 402 may then load the instructions from memory 404 to an internal register or internal cache. To execute the instructions, processor 402 may retrieve the instructions from the internal register or internal cache and decode them. During or after execution of the instructions, processor 402 may write one or more results (which may be intermediate or final results) to the internal register or internal cache. Processor 402 may then write one or more of those results to memory 404. In particular embodiments, processor 402 executes only instructions in one or more internal registers or internal caches or in memory 404 (as opposed to storage 406 or elsewhere) and operates only on data in one or more internal registers or internal caches or in memory 404 (as opposed to storage 406 or elsewhere). One or more memory buses (which may each include an address bus and a data bus) may couple processor 402 to memory 404. Bus 412 may include one or more memory buses, as described below. In particular embodiments, one or more memory management units (MMUs) reside between processor 402 and memory 404 and facilitate accesses to memory 404 requested by processor 402. In particular embodiments, memory 404 includes RAM. This RAM may be volatile memory, where appropriate. Where appropriate, this RAM may be dynamic RAM (DRAM) or static RAM (SRAM). Moreover, where appropriate, this RAM may be single-ported or multi-ported RAM. The present disclosure contemplates any suitable RAM. Memory 404 may include one or more memories 404, where appropriate. Although this disclosure describes and illustrates particular memory, this disclosure contemplates any suitable memory.

In particular embodiments, storage 406 includes mass storage for data or instructions. As an example and not by way of limitation, storage 406 may include an HDD, a floppy disk drive, flash memory, an optical disc, a magneto-optical disc, magnetic tape, or a Universal Serial Bus (USB) drive or a combination of two or more of these. Storage 406 may include removable or non-removable (or fixed) media, where appropriate. Storage 406 may be internal or external to computer system 400, where appropriate. In particular embodiments, storage 406 is non-volatile, solid-state memory. In particular embodiments, storage 406 includes ROM. Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 406 taking any suitable physical form. Storage 406 may include one or more storage control units facilitating communication between processor 402 and storage 406, where appropriate. Where appropriate, storage 406 may include one or more storages 406. Although this disclosure describes and illustrates particular storage, this disclosure contemplates any suitable storage.

In particular embodiments, I/O interface 408 includes hardware, software, or both providing one or more interfaces for communication between computer system 400 and one or more I/O devices. Computer system 400 may include one or more of these I/O devices, where appropriate. One or more of these I/O devices may enable communication between a person and computer system 400. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 408 for them. Where appropriate, I/O interface 408 may include one or more device or software drivers enabling processor 402 to drive one or more of these I/O devices. I/O interface 408 may include one or more I/O interfaces 408, where appropriate. Although this disclosure describes and illustrates a particular I/O interface, this disclosure contemplates any suitable I/O interface.

In particular embodiments, communication interface 410 includes hardware, software, or both providing one or more interfaces for communication (such as, for example, packet-based communication) between computer system 400 and one or more other computer systems 400 or one or more networks. As an example and not by way of limitation, communication interface 410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 410 for it. As an example and not by way of limitation, computer system 400 may communicate with an ad hoc network, a PAN, a LAN, a WAN, a MAN, or one or more portions of the Internet or a combination of two or more of these. One or more portions of one or more of these networks may be wired or wireless. As an example, computer system 400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 400 may include any suitable communication interface 410 for any of these networks, where appropriate. Communication interface 410 may include one or more communication interfaces 410, where appropriate. Although this disclosure describes and illustrates a particular communication interface, this disclosure contemplates any suitable communication interface.

In particular embodiments, bus 412 includes hardware, software, or both coupling components of computer system 400 to each other. As an example and not by way of limitation, bus 412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 412 may include one or more buses 412, where appropriate. Although this disclosure describes and illustrates a particular bus, this disclosure contemplates any suitable bus or interconnect.

Herein, reference to a computer-readable storage medium encompasses one or more non-transitory, tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 35 U.S.C. §101. Herein, reference to a computer-readable storage medium excludes transitory forms of signal transmission (such as a propagating electrical or electromagnetic signal per se) to the extent that they are not eligible for patent protection under 35 U.S.C. §101. A computer-readable non-transitory storage medium may be volatile, non-volatile, or a combination of volatile and non-volatile, where appropriate.

This disclosure contemplates one or more computer-readable storage media implementing any suitable storage. In particular embodiments, a computer-readable storage medium implements one or more portions of processor 402 (such as, for example, one or more internal registers or caches), one or more portions of memory 404, one or more portions of storage 406, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, processing system code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, or a suitable extension thereof. In particular embodiments, software is expressed in a lower-level programming language, such as assembly language (or processing system code). In particular embodiments, software is expressed in JAVA. In particular embodiments, software is expressed in Hyper Text Markup Language (HTML), Extensible Markup Language (XML), or other suitable markup language.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

Herein, "detect" may include determining, checking, polling, monitoring, or any other appropriate action to ascertain a state change of a referenced system. For example, some embodiments of failing processing system 110 may detect that a failure event has occurred by determining that certain software and/or hardware of failing processing system 110 has become inoperable and/or non-responsive. In some embodiments, failing processing system 110 may detect that a failure event has occurred by detecting a power failure of/to failing processing system 110.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A system, comprising:
    a first processing system;
    a plurality of proxy processing systems separate from the first processing system; and
    a server, wherein:
        the server is part of a network of processing systems of which the first processing system and the plurality of proxy processing systems are a part;
        in response to a failure event of the first processing system detected by a network interface of the first processing system, the network interface generates a notification to the plurality of proxy processing systems, the notification comprising an indication of the failure event and communicated on behalf of the first processing system to each proxy processing system of the plurality of proxy processing systems using multicasting, the failure event causing the first processing system to be at least partially inoperable by a software or hardware failure; and
        each proxy processing system of the plurality of proxy processing systems at least:
            receives the notification;
            determines that a different proxy processing system of the plurality of proxy processing systems also received the notification as a result of the multicasting;
            detects a parameter associated with the plurality of proxy processing systems;
            communicates with the different proxy processing system to determine, based at least in part on the detected parameter, a selected proxy processing system of the proxy processing system and the different proxy processing system; and
            causes the selected proxy processing system to communicate, using a reliable communications protocol, the notification to the server on behalf of the first processing system.

2. The system of claim 1, wherein the network interface of the first processing system is further operable to:
    determine a timestamp indicating when the failure event occurred;
    access data associated with the failure event; and
    formulate the notification using at least the timestamp and the data prior to communicating the notification.

3. The system of claim 1, wherein the network interface of the first processing system is further operable to:
    access a plurality of pre-crafted notification messages stored in one or more memory devices coupled to the first processing system;
    compare the plurality of pre-crafted notification messages with the failure event; and
    select, based at least in part on the comparison, a pre-crafted notification message from the plurality of pre-crafted notification messages to include in the notification communicated to the plurality of proxy processing systems.

4. The system of claim 1, wherein the failure event comprises one or more of the following errors:
    a power failure;
    a software crash;
    a hardware malfunction; or
    a temperature of the first processing system exceeding a predetermined temperature.

5. The system of claim 1, wherein the server is operable to receive the notification, and in response, cause traffic to be routed away from the first processing system.

6. The system of claim 1, wherein at least one of the plurality of proxy processing systems is integrated with the first processing system.

7. The system of claim 1, wherein the first processing system and the second processing system are servers.

8. A computer-implemented method, comprising:
    detecting, by a first processing system, that a failure event has occurred, the failure event operable to cause the first processing system to become at least partially inoperable due to a software or hardware failure; and
    communicating, through a network interface of the first processing system including circuitry that detects the failure event, a multicasted notification to a plurality of proxy processing systems separate from the first processing system, the notification comprising an indication of the failure event, to cause at least one proxy processing system of the plurality of processing systems to at least:
        determine that a different proxy processing system of the plurality of proxy processing systems also received the notification;
        detect a parameter associated with the plurality of proxy processing systems;
        communicate with the different proxy processing system to determine, based at least in part on the detected parameter, a selected proxy processing system of the proxy processing system and the different proxy processing system; and cause the selected proxy processing system to communicate the notification to a second processing system on behalf of the first processing system using a reliable communications protocol.

9. The computer-implemented method of claim 8, further comprising:
   determining, by the network interface, a timestamp indicating when the failure event occurred;
   accessing, by the network interface, data associated with the failure event; and
   formulating, by the network interface prior to communicating the notification, the notification using at least the timestamp and the data.

10. The computer-implemented method of claim 8, further comprising selecting a pre-crafted notification message from a plurality of pre-crafted notification messages to include in the notification communicated to the two or more proxy processing systems, wherein the plurality of pre-crafted notification messages are stored in one or more memory devices coupled to the first processing system.

11. The computer-implemented method of claim 8, wherein the failure event comprises one or more of the following errors:
   a power failure;
   a software crash;
   a hardware malfunction; or
   a temperature of the first processing system exceeding a predetermined temperature.

12. The computer-implemented method of claim 8, further comprising receiving the notification at the second processing system, and in response, causing traffic to be routed away from the first processing system.

13. The computer-implemented method of claim 8, further comprising transmitting, by the at least one of the plurality of proxy processing systems, an indication that causes at least one other proxy processing system of the plurality of proxy processing systems not to communicate the notification to the second processing system.

14. A non-transitory computer-readable medium having stored thereon one or more executable instructions that, when executed by one or more processing units of a computer system, cause the computer system to at least:
   receive a multicasted notification from a first processing system separate from the computer system, communication of the notification initiated by a network interface of the first processing system as a result of the first processing system becoming at least partially inoperable, the notification multicasted by the network interface to each of a plurality of proxy processing systems that includes the computer system, the notification comprising an indication of the failure event;
   determine that a different proxy processing system of the plurality of proxy processing systems also received the notification;
   detect a parameter associated with the plurality of proxy processing systems;
   communicate with the different proxy processing system to determine, based at least in part on the detected parameter, a selected proxy processing system of the proxy processing system and the different proxy processing system; and
   cause the selected proxy processing system to communicate the notification to a second processing system on behalf of the first processing system, the notification communicated to the second processing system using a reliable communications protocol.

15. The non-transitory computer-readable medium of claim 14, wherein the notification comprises a User Datagram Protocol (UDP) message.

16. The non-transitory computer-readable medium of claim 14, wherein the instructions, when executed by the one or more processing units, further cause the computer system to cause the selected proxy processing system to prevent another proxy processing system of the plurality of proxy processing systems from communicating the notification to the second processing system.

17. The non-transitory computer-readable medium of claim 14, wherein the failure event comprises one or more of the following errors:
   a power failure;
   a software crash;
   a hardware malfunction; or
   a temperature of the first processing system exceeding a predetermined temperature.

18. The non-transitory computer-readable medium of claim 14, wherein the instructions, when executed by the one or more processing units, further cause the computer system to communicate, by the selected proxy processing system to at least one other proxy processing system of the plurality of proxy processing systems, an indication that the notification was successfully communicated to the second processing system.

19. The non-transitory computer-readable medium of claim 18, wherein the indication that the notification was successfully communicated to the processing system causes the at least one other proxy processing system not to communicate the notification to the second processing system.

20. The non-transitory computer-readable medium of claim 14, wherein the selected proxy processing system is the computer system.

* * * * *